(12) United States Patent
Asterjadhi

(10) Patent No.: US 9,780,911 B2
(45) Date of Patent: Oct. 3, 2017

(54) SIGNALING DIFFERENT MCS SETS FOR DIFFERENT BANDWIDTHS

(71) Applicant: QUALCOMM Incorporated, San Diego, CA (US)

(72) Inventor: Alfred Asterjadhi, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 94 days.

(21) Appl. No.: 14/832,994

(22) Filed: Aug. 21, 2015

(65) Prior Publication Data

US 2016/0065327 A1 Mar. 3, 2016

Related U.S. Application Data

(60) Provisional application No. 62/042,721, filed on Aug. 27, 2014.

(51) Int. Cl.
*H04L 1/00* (2006.01)

(52) U.S. Cl.
CPC .......... *H04L 1/0003* (2013.01); *H04L 1/0009* (2013.01); *H04L 1/0028* (2013.01)

(58) Field of Classification Search
CPC .... H04L 1/0003; H04L 1/0009; H04W 84/12; H04W 88/08
See application file for complete search history.

(56) References Cited

U.S. PATENT DOCUMENTS

| | | | | |
|---|---|---|---|---|
| 2008/0219219 A1* | 9/2008 | Sartori | ................... | H04L 1/0003 370/335 |
| 2013/0148625 A1* | 6/2013 | Kim | ..................... | H04L 1/0025 370/329 |
| 2013/0215813 A1* | 8/2013 | Kotecha | ................ | H04L 1/0017 370/312 |

OTHER PUBLICATIONS

Chu L., "LB200 MAC Comment Resolution Subclause 8.4.2.170w; 11-14-0359-01-00ah-lb200-mac-comment-resolutionsubclause-8-4-2-170w", IEEE Draft; 11-14-0359-01-00AH-LB200-MAC-Commentresolution-Subclause-8-4-2-170W, IEEE-SA Mentor, Piscataway, NJ USA, vol. 802.11ah, No. 1, Mar. 19, 2014 (Mar. 19, 2014), pp. 1-6, XP068069028, [retrieved on Mar. 19, 2014].
International Search Report and Written Opinion—PCT/US2015/046542—ISA/EPO—Nov. 24, 2015.
Jafarian A., "Multirate Support; 11-14-0139-01-00ah-multirate-support", IEEE Draft; 11-14-0139-01-00AH-Multirate-Support, IEEE-SA Mentor, Piscataway, NJ USA, vol. 802.11 ah, No. 1, Jan. 23, 2014 (Jan. 23, 2014), pp. 1-19, XP068063709, [retrieved on Jan. 23, 2014].
Zhang H., "d10 PHY capabilities Comment Resolutions; 11-13-1379-00-00ah-d10-phy-capabilities-commentresolutions", IEEE Draft; 11-13-1379-00-00AH-D10-PHY-Capabilitiescomment-Resolutions, IEEE-SA Mentor, Piscataway, NJ, USA, vol. 802.11 ah, Nov. 11, 2013 (Nov. 11, 2013), pp. 1-4, XP068063394, [retrieved on Nov. 11, 2013].

* cited by examiner

*Primary Examiner* — Jamal Javaid
(74) *Attorney, Agent, or Firm* — Patterson & Sheridan, LLP

(57) ABSTRACT

Certain aspects of the present disclosure generally relate to wireless communications and, more particularly, to using fields of a frame to indicate different modulation and coding scheme (MCS) sets for communications on a first bandwidth and on a second bandwidth.

28 Claims, 13 Drawing Sheets

| Subfield | Definition | Encoding |
|---|---|---|
| Rx S1G-MCS Map | Indicates the maximum value of the RXVECTOR parameter MCS of a PPDU that can be received at all channel widths supported by this STA for each number of spatial streams | The format and encoding of this subfield are defined in Figure 9 and the associated description. If Rx Single Spatial Stream and S1G-MCS Map for 1 MHz subfield is greater than or equal to 1, then only the value of the Max S1G-MCS For 1 SS subfield that is indicated by the Rx Single Spatial Stream and S1G-MCS Map subfield is applicable for 1 MHz channel width. |
| Rx Highest Supported Long GI Data Rate | Indicates the highest long GI S1G data rate that the STA is able to receive. | The largest integer value less than or equal to the highest long GI S1G PPDU data rate in Mb/s that the STA is able to receive .<br><br>The value 0 indicates that this subfield does not specify the highest long GI S1G PPDU data rate that the STA is able to receive. |
| Tx S1G-MCS Map | Indicates the maximum value of the TXVECTOR parameter MCS of a PPDU that can be transmitted at all channel widths supported by this STA for each number of spatial streams. | The format and encoding of this subfield are defined in Figure 9 and the associated description. If Tx Single Spatial Stream and S1G-MCS Map for 1 MHz subfield is greater than or equal to 1, then only the value of the Max S1G-MCS For 1 SS subfield that is indicated by the Tx Single Spatial Stream and S1G-MCS Map subfield is applicable for 1 MHz channel width. |
| Tx Highest Supported Long GI Data Rate | Indicates the highest long GI S1G PPDU data rate that the STA is able to transmit at. | The largest integer value less than or equal to the highest long GI S1G PPDU data rate in Mb/s that the STA is able to transmit.<br><br>The value 0 indicates that this subfield does not specify the highest long GI S1G PPDU data rate that the STA is able to transmit. |

FIG. 8A

| Subfield | Definition | Encoding |
|---|---|---|
| Rx Single Spatial Stream and S1G-MCS Map for 1 MHz | Indicates whether only a single spatial stream PPDU can be received at 1 MHz channel width by this STA. | 0: same number of spatial streams and same Max S1G-MCS as indicated by Rx S1G-MCS Map field.<br><br>1: single spatial stream only and with Max S1G-MCS as indicated by a value of 0 in the S1G-MCS for 1 SS subfield.<br><br>2: single spatial stream only and with Max S1G-MCS as indicated by a value of 1 in the S1G-MCS for 1 SS subfield.<br><br>3: single spatial stream only and with Max S1G-MCS as indicated by a value of 2 in the S1G-MCS for 1 SS subfield. |
| Tx Single Spatial Stream and S1G-MCS Map for 1 MHz | Indicates whether only a single spatial stream PPDU can be transmitted at 1 MHz channel width by this STA. | 0: same number of spatial streams and same Max S1G-MCS as implied indicated by Tx S1G-MCS Map field.<br><br>1: single spatial stream only and with Max S1G-MCS as indicated by a value of 0 in the S1G-MCS for 1 SS subfield.<br><br>2: single spatial stream only and with Max S1G-MCS as indicated by a value of 1 in the S1G-MCS for 1 SS subfield.<br><br>3: single spatial stream only and with Max S1G-MCS as indicated by a value of 2 in the S1G-MCS for 1 SS subfield. |

FIG. 8B

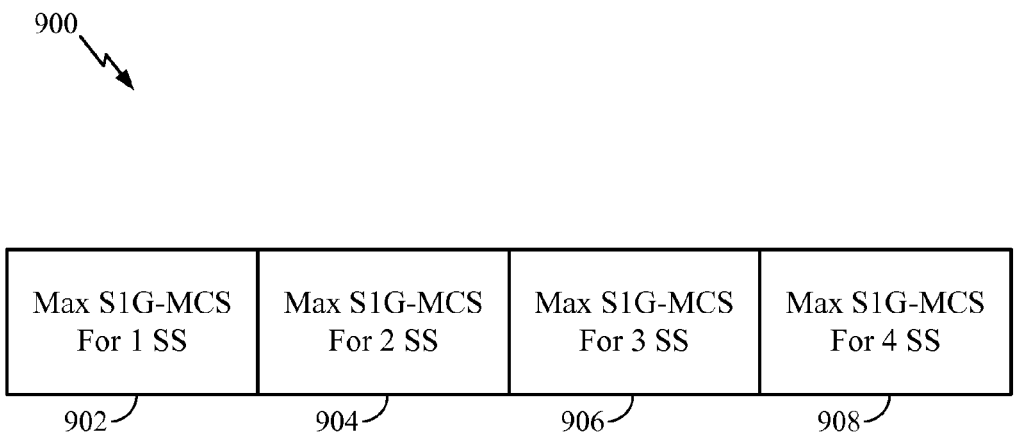

The Max S1G-MCS for *n* SS subfield (where *n*=1,...,4) is encoded as follows:

| Max S1G-MCS for *n* SS subfield value | Supported MCS set |
|---|---|
| 0 | S1G-MCS 2 for *n* spatial streams |
| 1 | S1G-MCS 7 for *n* spatial streams |
| 2 | S1G-MCS 9 for *n* spatial streams |
| 3 | *n* spatial streams is not supported |

NOTE-An S1G-MCS indicated as supported in the S1G-MCS Map fields for a particular number of spatial streams might not be valid at all bandwidths and might be limited by the declaration of Tx Highest Supported Long GI Data Rates and Rx Highest Supported Long GI Data Rates and might be affected by additional rate selection constraints for S1G PPDUs.

NOTE-For 1 MHz, MCS10 is always supported.

FIG. 9

SIGNALING DIFFERENT MCS SETS FOR DIFFERENT BANDWIDTHS

CROSS-REFERENCE TO RELATED APPLICATIONS

The present Application for Patent claims priority to U.S. Provisional Application No. 62/042,721, filed Aug. 27, 2014, which is assigned to the assignee of the present application and hereby expressly incorporated by reference herein in its entirety.

BACKGROUND

Field of the Disclosure

Certain aspects of the present disclosure generally relate to wireless communications and, more particularly, to using fields of a frame to indicate different modulation and coding scheme (MCS) sets for communications on a first bandwidth and on a second bandwidth.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various techniques are being developed. One such technique is the sub-one gigahertz (S1G) frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

Another technique to achieve greater coverage and increased communication range involves wireless communications devices (e.g., stations and access points) capable of communicating with wide bandwidths (e.g., more than one MHz bandwidth) using a one MHz bandwidth communication mode to achieve longer range communications (e.g., range extension). In order to facilitate communications, wireless communications devices may advertise their capabilities through various transmissions. Wireless communications devices operating under previous versions (e.g., IEEE Std 802.11ac) of wireless communications standards may advertise their capability to support an MCS set that applies across all bandwidths by setting values in fields of advertising frames the devices transmit.

SUMMARY

Certain aspects of the present disclosure provide an apparatus for wireless communications. The apparatus generally includes a processing system configured to generate a frame having a first field that indicates a modulation and coding scheme (MCS) set that the apparatus is capable of supporting for a first bandwidth and a second field that indicates an MCS set that the apparatus is capable of supporting for a second bandwidth, wherein different values of the second field indicate different MCS sets the apparatus is capable of supporting for the second bandwidth, and an interface configured to output the frame for transmission.

Certain aspects of the present disclosure provide an apparatus for wireless communications. The apparatus generally includes an interface for receiving a frame, from a wireless node, having a first field and a second field, and a processing system configured to determine, from a value of the first field, a modulation and coding scheme (MCS) set the wireless node supports for a first bandwidth, to determine, from a value of the second field, an MCS set the wireless node supports for a second bandwidth, and to configure the apparatus to communicate with the wireless node using at least one of: the first bandwidth and a MCS in the first MCS set, or the second bandwidth and a MCS in the second MCS set.

Certain aspects of the present disclosure provide a method for wireless communications by an apparatus. The method generally includes generating a frame having a first field that indicates a modulation and coding scheme (MCS) set that the apparatus is capable of supporting for a first bandwidth and a second field that indicates an MCS set that the apparatus is capable of supporting for a second bandwidth, wherein different values of the second field indicate different MCS sets the apparatus is capable of supporting for the second bandwidth, and outputting the frame for transmission.

Certain aspects of the present disclosure provide a method for wireless communications by an apparatus. The method generally includes receiving a frame, from a wireless node, having a first field and a second field, determining, from a value of the first field, a modulation and coding scheme (MCS) set the wireless node supports for a first bandwidth, determining, from a value of the second field, an MCS set the wireless node supports for a second bandwidth, and to communicating with the wireless node using at least one of: the first bandwidth and a MCS in the first MCS set, or the second bandwidth and a MCS in the second MCS set.

Certain aspects of the present disclosure provide an apparatus for wireless communications. The apparatus generally includes means for generating a frame having a first field that indicates a modulation and coding scheme (MCS) set that the apparatus is capable of supporting for a first bandwidth and a second field that indicates an MCS set that the apparatus is capable of supporting for a second bandwidth, wherein different values of the second field indicate different MCS sets the apparatus is capable of supporting for the second bandwidth, and means for outputting the frame for transmission.

Certain aspects of the present disclosure provide an apparatus for wireless communications. The apparatus generally includes means for receiving a frame, from a wireless node, having a first field and a second field, means for determining, from a value of the first field, a modulation and coding scheme (MCS) set the wireless node supports for a first bandwidth, means for determining, from a value of the second field, an MCS set the wireless node supports for a second bandwidth, and means for communicating with the wireless node using at least one of: the first bandwidth and a MCS in the first MCS set, or the second bandwidth and a MCS in the second MCS set.

Certain aspects of the present disclosure provide a computer readable medium for wireless communications having instructions stored thereon. The instructions generally include instructions for generating a frame having a first field that indicates a modulation and coding scheme (MCS) set that an apparatus is capable of supporting for a first bandwidth and a second field that indicates an MCS set that the apparatus is capable of supporting for a second bandwidth, wherein different values of the second field indicate different MCS sets the apparatus is capable of supporting for the second bandwidth, and outputting the frame for transmission.

Certain aspects of the present disclosure provide a computer readable medium for wireless communications having instructions stored thereon. The instructions generally include instructions for receiving a frame, from a wireless node, having a first field and a second field, determining, from a value of the first field, a modulation and coding scheme (MCS) set the wireless node supports for a first bandwidth, determining, from a value of the second field, an MCS set the wireless node supports for a second bandwidth, and to communicating with the wireless node using at least one of: the first bandwidth and a MCS in the first MCS set, or the second bandwidth and a MCS in the second MCS set.

Certain aspects of the present disclosure provide a station (STA). The STA generally includes at least one antenna, a processing system configured to generate a frame having a first field that indicates a modulation and coding scheme (MCS) set that the STA is capable of supporting for a first bandwidth and a second field that indicates an MCS set that the STA is capable of supporting for a second bandwidth, wherein different values of the second field indicate different MCS sets the STA is capable of supporting for the second bandwidth, and a transmitter configured to transmit the frame, via the at least one antenna, to a wireless node.

Certain aspects of the present disclosure provide an access point (AP). The AP generally includes at least one antenna; a receiver configured to receive, via the at least one antenna, a frame having a first field and a second field from a wireless node, a transmitter, and a processing system configured to determine, from a value of the first field, a modulation and coding scheme (MCS) set the wireless node supports for a first bandwidth and to determine, from a value of the second field, an MCS set the wireless node supports for a second bandwidth, and to configure the transmitter and receiver to communicate with the wireless node using at least one of: the first bandwidth and a MCS in the first MCS set, or the second bandwidth and a MCS in the second MCS set.

Certain aspects also provide various methods, apparatuses, and computer program products capable of performing operations corresponding to those described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 8A and 8B combined illustrate exemplary subfield definitions, in accordance with certain aspects of the present disclosure.

FIG. 9 illustrates an exemplary subfield map, in accordance with certain aspects of the present disclosure.

DETAILED DESCRIPTION

Figure 1:
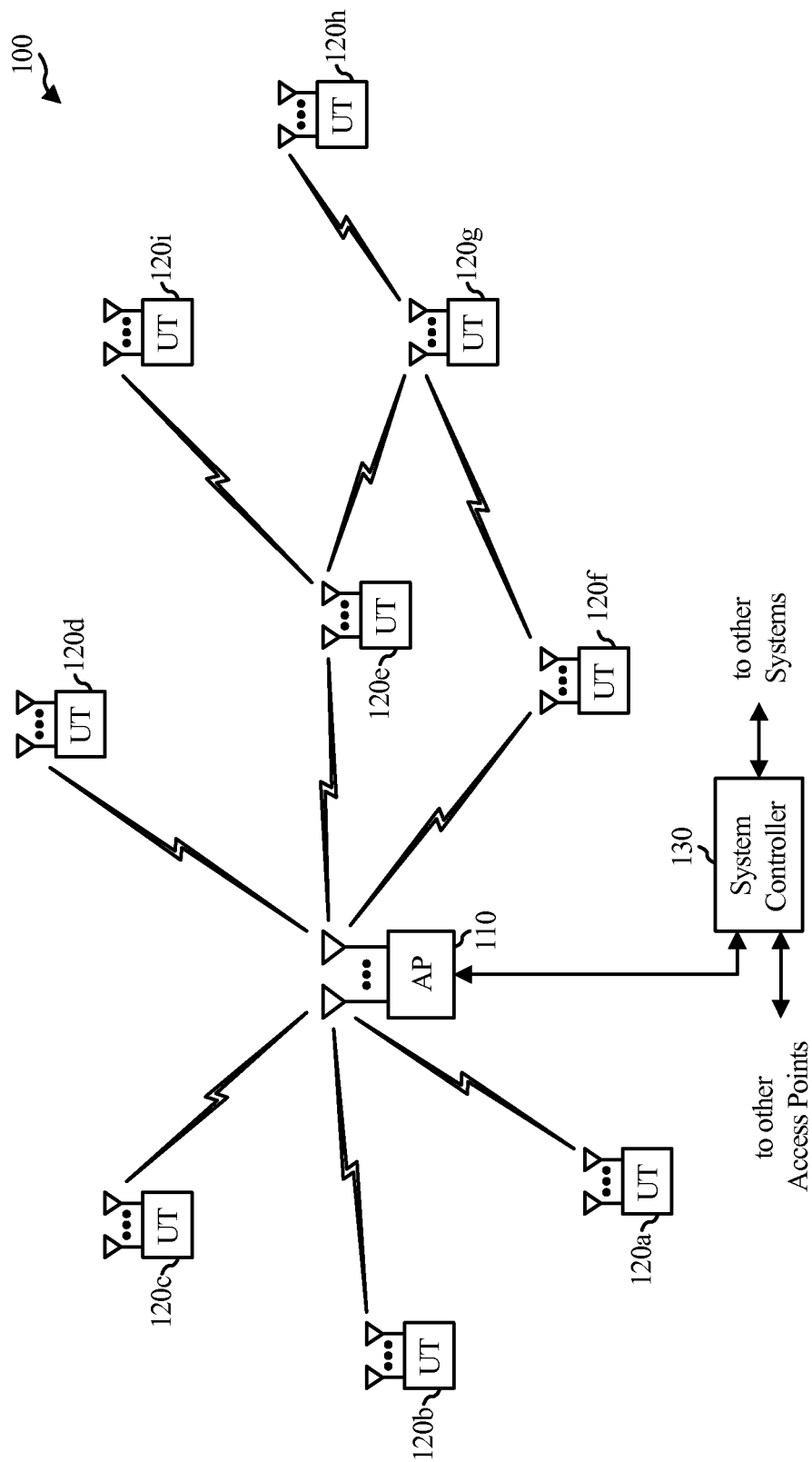
FIG. 1 illustrates a diagram of an example wireless communications network, in accordance with certain aspects of the present disclosure.

Demand for improved data transmission rates of wireless networks has led to the development of devices capable of communicating using wide (e.g., more than one MHz) bandwidths. Wireless communications devices (e.g., stations and access points) capable of communicating with wide bandwidths typically use a one MHz bandwidth communication mode to communicate over longer ranges in a technique sometimes referred to as range extension. That is, a device may use a wide bandwidth when communicating with nearby devices in order to have an improved data transmission rate, while communicating with another device over a long distance using a one MHz bandwidth communication mode to improve the reliability of the communication over the long distance. When communicating with the one MHz bandwidth communication mode, the devices use only low modulation and coding schemes (including, e.g., MCS10), because the low modulation and coding schemes (MCSs) also improve the reliability of the communication. If a device finds that channel quality of a one MHz bandwidth channel supports higher MCSs, then the device typically also finds that the channel quality supports use of a wider (e.g., two MHz and higher) bandwidth channel using an MCS that provides an equivalent data throughput rate as a one MHz bandwidth channel using higher MCSs.

Previous versions (e.g., IEEE Std 802.11ac) of wireless communications standards enable a device to use a single set of MCSs for all bandwidths the device supports. That is, a device uses the same set of MCSs for a one MHz bandwidth channel as the device uses for a wider (e.g., two MHz) bandwidth channel. Aspects of the present disclosure provide enhancements allowing a device to enable an MCS set for communications on a channel of a first bandwidth (e.g., one MHz bandwidth) while enabling a different MCS set (e.g., higher MCSs) for wider bandwidth channels. Aspects of the present disclosure also provide enhancements to signaling that allow a wireless node (e.g., a station (STA) or access point (AP)) to indicate one transmit (TX) and receive (RX) MCS set for greater than or equal to two MHz bandwidth communications and another MCS set (e.g., a different MCS set) for smaller than one MHz bandwidth communications.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals in which aspects of the present disclosure may be practiced. For example, one or more user terminals 120 may signal capabilities (e.g., to access point 110) using the techniques provided herein.

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The access point 110 and user terminals 120 employ multiple transmit and multiple receive antennas for data transmission on the downlink and uplink. For downlink MIMO transmissions, $N_{ap}$ antennas of the access point 110 represent the multiple-input (MI) portion of MIMO, while a set of K user terminals represent the multiple-output (MO) portion of MIMO. Conversely, for uplink MIMO transmissions, the set of K user terminals represent the MI portion, while the $N_{ap}$ antennas of the access point 110 represent the MO portion. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
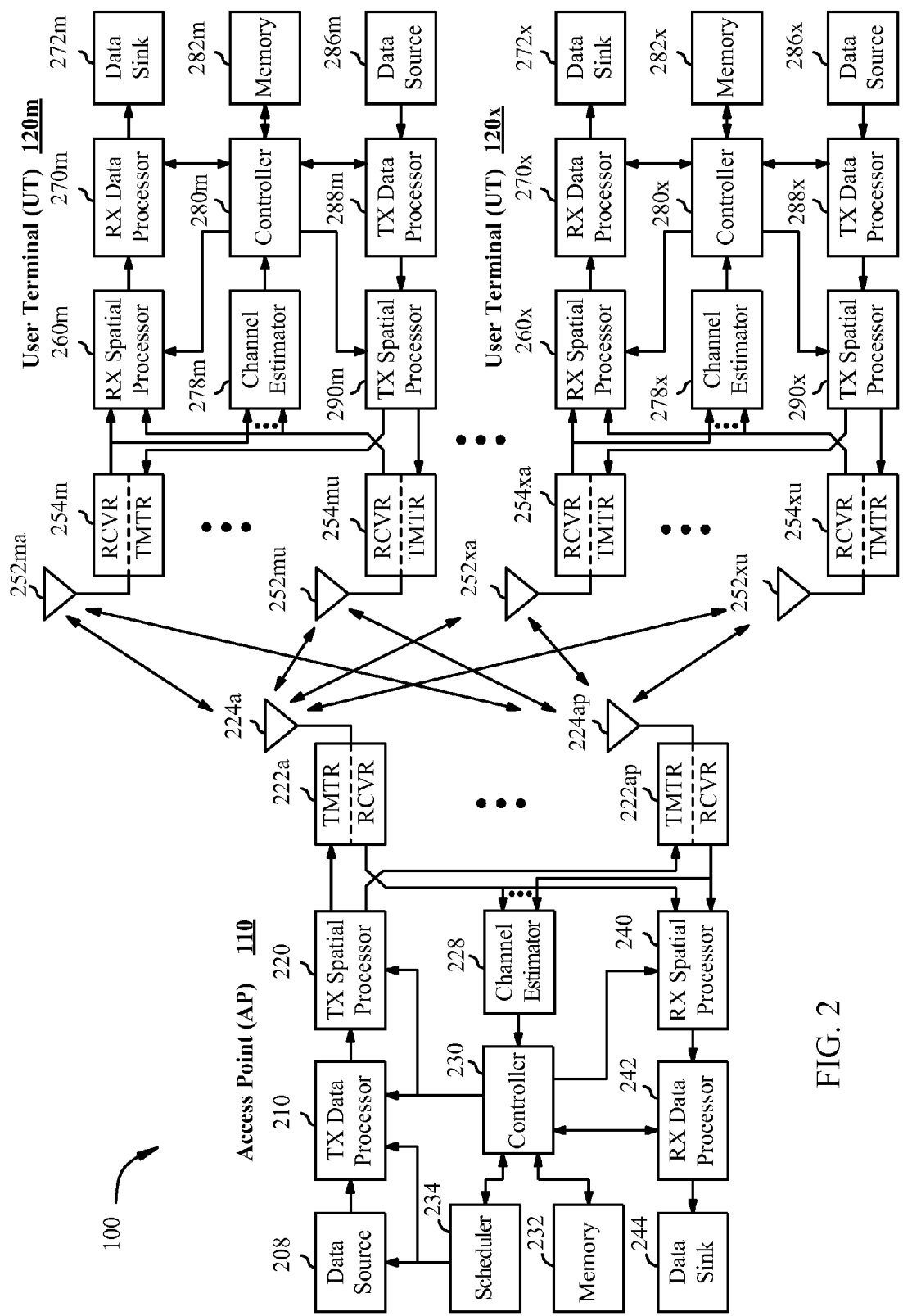
FIG. 2 illustrates a block diagram of an example access point (AP) and user terminals (UTs), in accordance with certain aspects of the present disclosure.

FIG. 2 illustrates a block diagram of access point 110 and two user terminals 120m and 120x in MIMO system 100 that may be examples of the access point 110 and user terminals 120 described above with reference to FIG. 1 and capable of performing the techniques described herein. The various processors shown in FIG. 2 may be configured to perform (or direct a device to perform) various methods described herein, for example, the operations 400 and 500 described in association with FIGS. 4 and 5.

The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink. For SDMA transmissions, $N_{up}$ user terminals simultaneously transmit on the uplink, while $N_{dn}$ user terminals are simultaneously transmitted to on the downlink by the access point 110. $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal. The decoded data for each user terminal may be provided to a data sink 272 for storage and/or a controller 280 for further processing.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
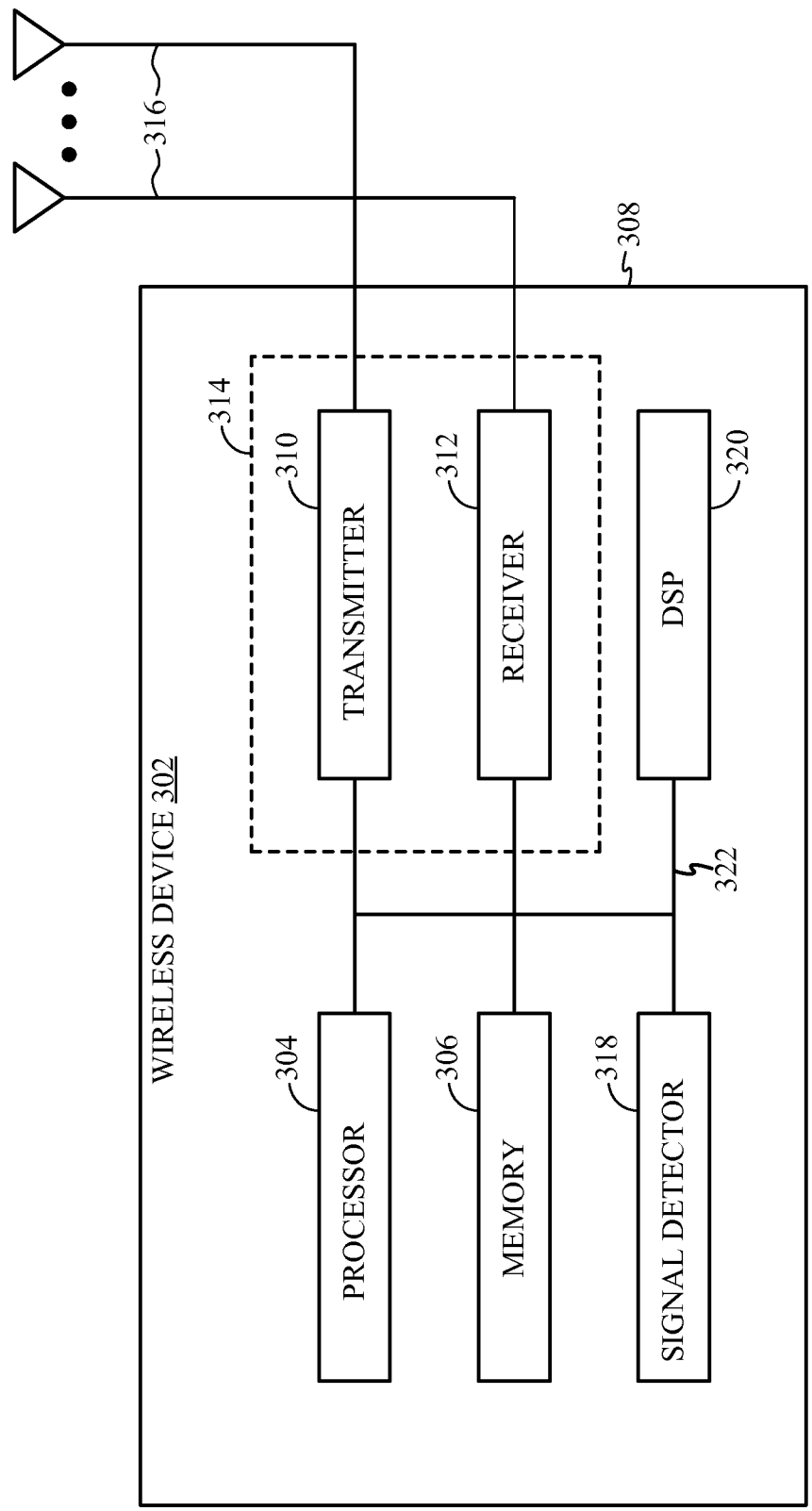
FIG. 3 illustrates a block diagram of an example wireless node, in accordance with certain aspects of the present disclosure.

FIG. 3 illustrates example components that may be utilized in AP 110 and/or UT 120 to implement aspects of the present disclosure. For example, the transmitter 310, antenna(s) 316, processor 304, and/or DSP 320 may be used to practice aspects of the present disclosure implemented by an AP or UT, such as operation 400 described in association with FIG. 4 below. Further, the receiver 312, antenna(s) 316, processor 304, and/or the DSP 320 may be used to practice aspects of the present disclosure implemented by an AP or UT, such as operation 500 described in association with FIG. 5. The wireless node (e.g., wireless device) 302 may be an access point 110 or a user terminal 120.

The wireless node (e.g., wireless device) 302 may include a processor 304 which controls operation of the wireless node 302. The processor 304 may also be referred to as a central processing unit (CPU). The processor 304 may control the wireless node 302 in executing the various methods described herein, for example, the operations 400 and 500 described in association with FIGS. 4 and 5. Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein, for example, the operations 400 and 500 described in association with FIGS. 4 and 5.

The wireless node 302 may also include a housing 308 that may include a transmitter 310 and a receiver 312 to allow transmission and reception of data between the wireless node 302 and a remote node. The transmitter 310 and receiver 312 may be combined into a transceiver 314. A single transmit antenna or a plurality of transmit antennas 316 may be attached to the housing 308 and electrically coupled to the transceiver 314. The wireless node 302 may also include (not shown) multiple transmitters, multiple receivers, and multiple transceivers.

The wireless node 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless node 302 may also include a digital signal processor (DSP) 320 for use in processing signals.

The various components of the wireless node 302 may be coupled together by a bus system 322, which may include a power bus, a control signal bus, and a status signal bus in addition to a data bus.

In general, an AP and STA may perform similar (e.g., symmetric or complementary) operations. Therefore, for many of the techniques described herein, an AP or STA may perform similar operations. To that end, the following description will sometimes refer to an "AP/STA" to reflect that an operation may be performed by either. Although, it should be understood that even if only "AP" or "STA" is used, it does not mean a corresponding operation or mechanism is limited to that type of device.

Example Signaling of MCS Sets for Different Bandwidths

Wireless communications devices (e.g., stations and access points) capable of communicating with wide bandwidths (e.g., more than one MHz bandwidth) typically use a one MHz bandwidth communication mode to achieve longer range communications (e.g., range extension). Because these devices typically use one MHz bandwidth mode for range extension, the devices use only low MCSs (including, e.g., MCS10) for one MHz bandwidth communication mode. If a device finds that channel quality of a one MHz bandwidth channel is good enough to support higher MCSs, then the device will typically find the channel quality is good enough to support a wider (e.g. two MHz and higher) bandwidth channel using an MCS that provides an equivalent data throughput rate as a one MHz channel using higher MCSs.

Previous versions (e.g. IEEE 802.11ac) of wireless communications standards enable a device to use a single set of MCSs for all bandwidths the device supports. According to aspects of the present disclosure, methods and apparatuses that allow a device to enable an MCS set for communications on a channel of a first bandwidth (e.g., one MHz bandwidth) while still enabling a different MCS set (for example, supporting higher MCSs) for wider bandwidth channels are provided.

Figure 4:
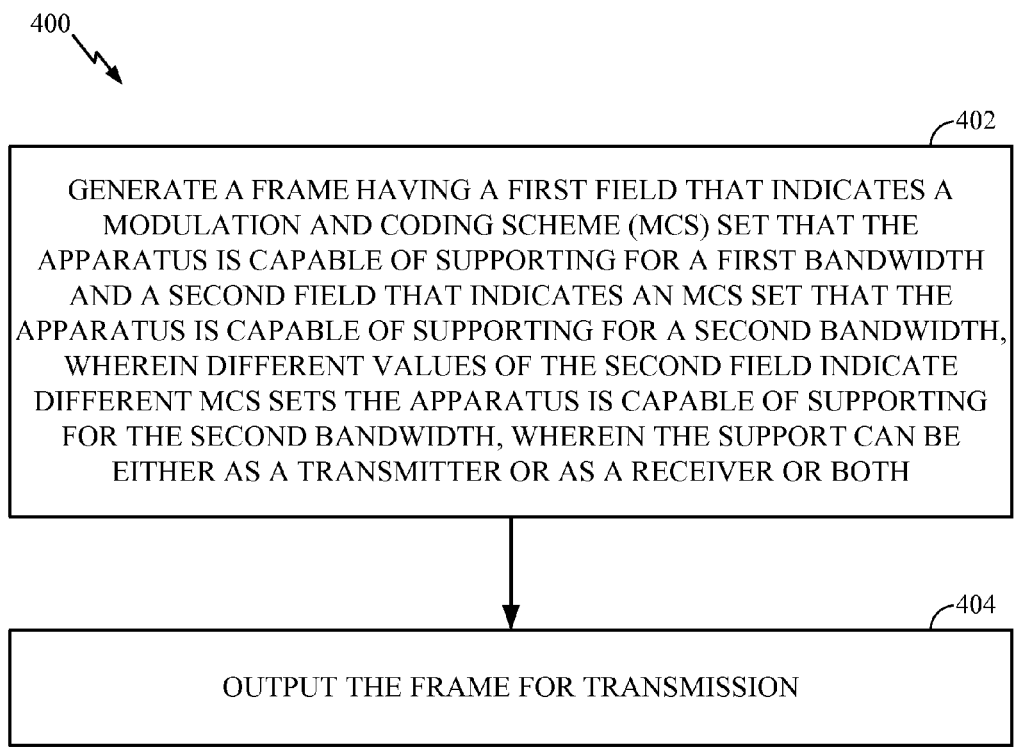
FIG. 4 sets forth example operations for wireless communications, in accordance with certain aspects of the present disclosure.

FIG. 4 sets forth example operations 400 for wireless communications, in accordance with certain aspects of the present disclosure. The operations 400 may be performed by an apparatus, for example, a station to advertise its capabilities.

Operations 400 may begin at 402, by generating a frame having a first field that indicates a first modulation and coding scheme (MCS) set that the apparatus is capable of supporting for a first bandwidth and a second field that indicates a second modulation and coding scheme (MCS) set that the apparatus is capable of supporting for a second bandwidth, wherein different values of the second field indicate different MCS sets the apparatus is capable of supporting for the second bandwidth, wherein the support can be either as a transmitter or as a receiver or both. At 404, the apparatus outputs the frame for transmission.

Figure 4A:
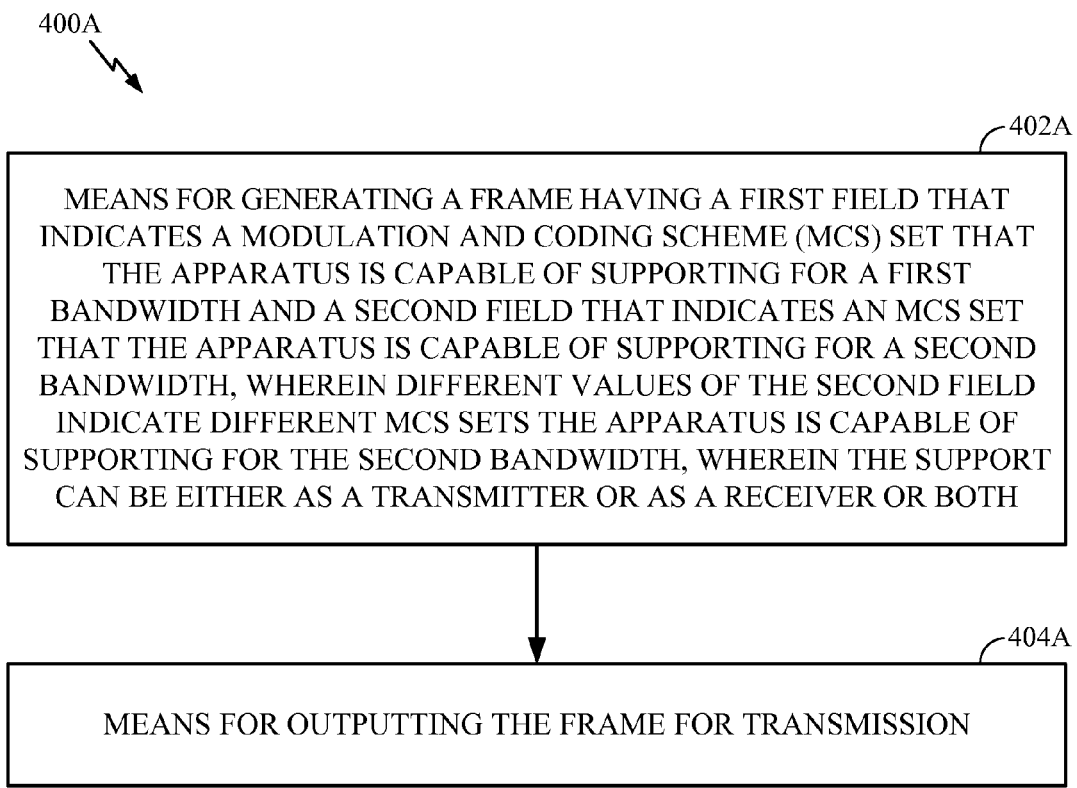
FIG. 4A illustrates example means capable of performing the operations set forth in FIG. 4.

FIG. 4A illustrates exemplary means 400A capable of performing the operations set forth in FIG. 4. The exemplary means 400A includes means 402A for generating a frame having a first field that indicates a first modulation and coding scheme (MCS) set that the apparatus is capable of supporting for a first bandwidth and a second field that indicates a second MCS set that the apparatus is capable of supporting for a second bandwidth, wherein different values of the second field indicate different MCS sets the apparatus is capable of supporting for the second bandwidth, wherein the support can be either as a transmitter or as a receiver or both. Means 402A may include, for example, controller 230, TX data processor 210, TX spatial processor 220, and/or processor 304 shown in FIG. 2 and FIG. 3. Exemplary means 400A also includes means 404A for outputting the frame for transmission. Means 404A may include, for example, controller 230, TX data processor 210, TX spatial processor 220, processor 304, and/or bus system 322 shown in FIG. 2 and FIG. 3.

Figure 5:
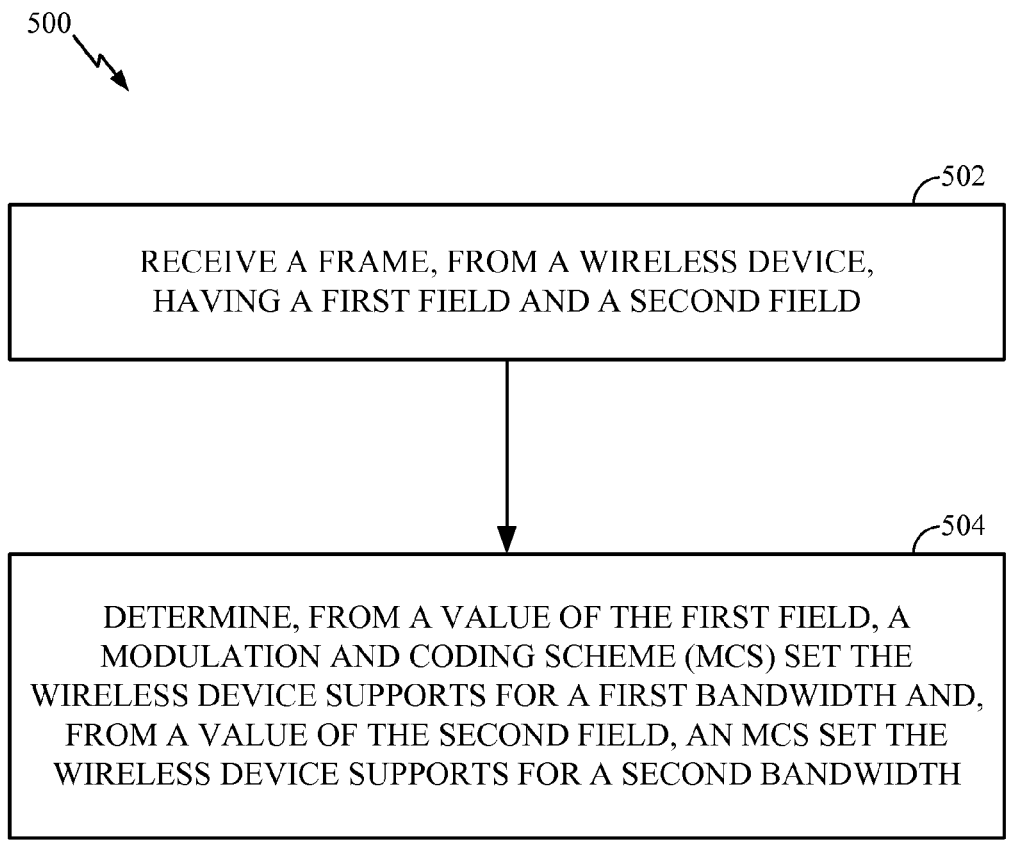
FIG. 5 sets forth example operations for wireless communications, in accordance with certain aspects of the present disclosure.

FIG. 5 sets forth example operations 500 for wireless communications, in accordance with aspects of the present disclosure. The operations 500 may be performed by an apparatus, for example, an access point and may be considered as complementary (AP-side) operations to operations 400.

Operations 500 may begin at 502, by receiving a frame, from a wireless node, having a first field and a second field. At 504, the apparatus determines, from a value of the first field, a first modulation and coding scheme (MCS) set the wireless node supports for a first bandwidth and, from a value of the second field, a second MCS set the wireless node supports for a second bandwidth. At 506, the apparatus communicates with the wireless node using at least one of: the first bandwidth and a MCS in the first MCS set, or the second bandwidth and a MCS in the second MCS set.

Figure 5A:
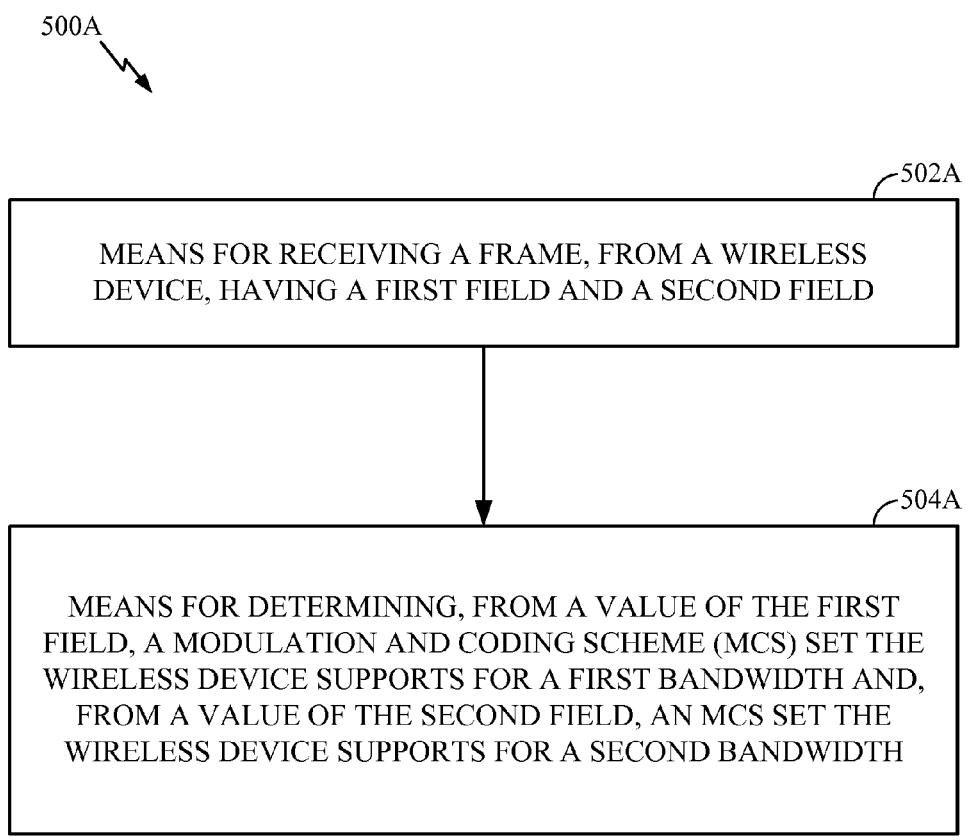
FIG. 5A illustrates example means capable of performing the operations set forth in FIG. 5.

FIG. 5A illustrates exemplary means 500A capable of performing the operations set forth in FIG. 5. The exemplary means 500A includes means 502A for receiving a frame, from a wireless node, having a first field and a second field. Means 502A may include, for example, antennas 224, antennas 252, receiver units 222, receiver units 254, RX spatial processor 240, RX spatial processors 260, RX data processor 242, RX data processors 270, controller 230, controllers 280, antennas 316, receiver 312, digital signal processor 320, and/or processor 304 shown in FIG. 2 and FIG. 3. Exemplary means 500A also includes means 504A for determining, from a value of the first field, a first modulation and coding scheme (MCS) set the wireless node supports for a first bandwidth and, from a value of the second field, a second MCS set the wireless node supports for a second bandwidth. Means 504A may include, for example, RX data processor 240, RX data processors 270, controller 230, controllers 280, and/or processor 304 shown in FIG. 2 and FIG. 3. Exemplary means 500A further includes means 506A for communicating with the wireless node using at least one of: the first bandwidth and a MCS in the first MCS set, or the second bandwidth and a MCS in the second MCS set. Means 506A may include, for example, controller 230, TX data processor 210, TX spatial processor 220, antennas 224, antennas 252, receiver units 222, receiver units 254, RX spatial processor 240, RX spatial processors 260, RX data processor 242, RX data processors 270, controller 230, controllers 280, antennas 316, receiver 312, digital signal processor 320, and/or processor 304 shown in FIG. 2 and FIG. 3.

The operations disclosed in association with FIGS. 4 and 5 may be performed by a sub-one gigahertz (S1G) station, for example. According to aspects of the present disclosure, an S1G STA may declare (e.g., to other STAs and/or APs) that it is an S1G STA by advertising its S1G Capabilities element.

Figure 6:
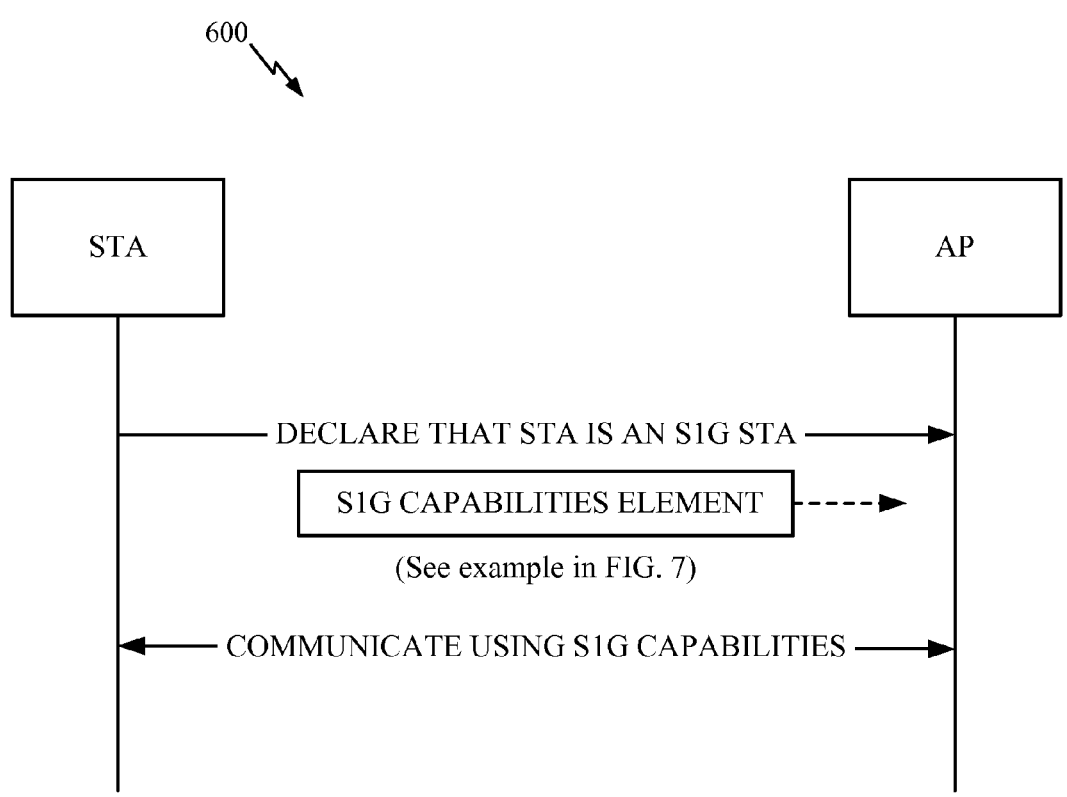
FIG. 6 illustrates an exemplary call flow, in accordance with certain aspects of the present disclosure.

FIG. 6 illustrates an exemplary call flow 600 between such a STA advertising its capabilities and an AP. In the exemplary call flow, the STA declares that the STA is an S1G STA by transmitting an S1G Capabilities element to the AP. An example of an S1G Capabilities element is described in detail below with reference to FIG. 7.

The AP and STA then proceed to communicate using S1G capabilities, including, for example, indicating an MCS set for communications using a channel of a first bandwidth and a different MCS set for communications using a channel of a second bandwidth, as described above with respect to FIGS. 4 and 5. While the example call flow illustrates a STA transmitting the S1G Capabilities element to the AP, the disclosure is not so limited. For example, an AP may transmit an S1G Capabilities element to a STA or another AP, and a STA may transmit an S1G Capabilities element to another STA, e.g., in a peer-to-peer network.

Figure 7:
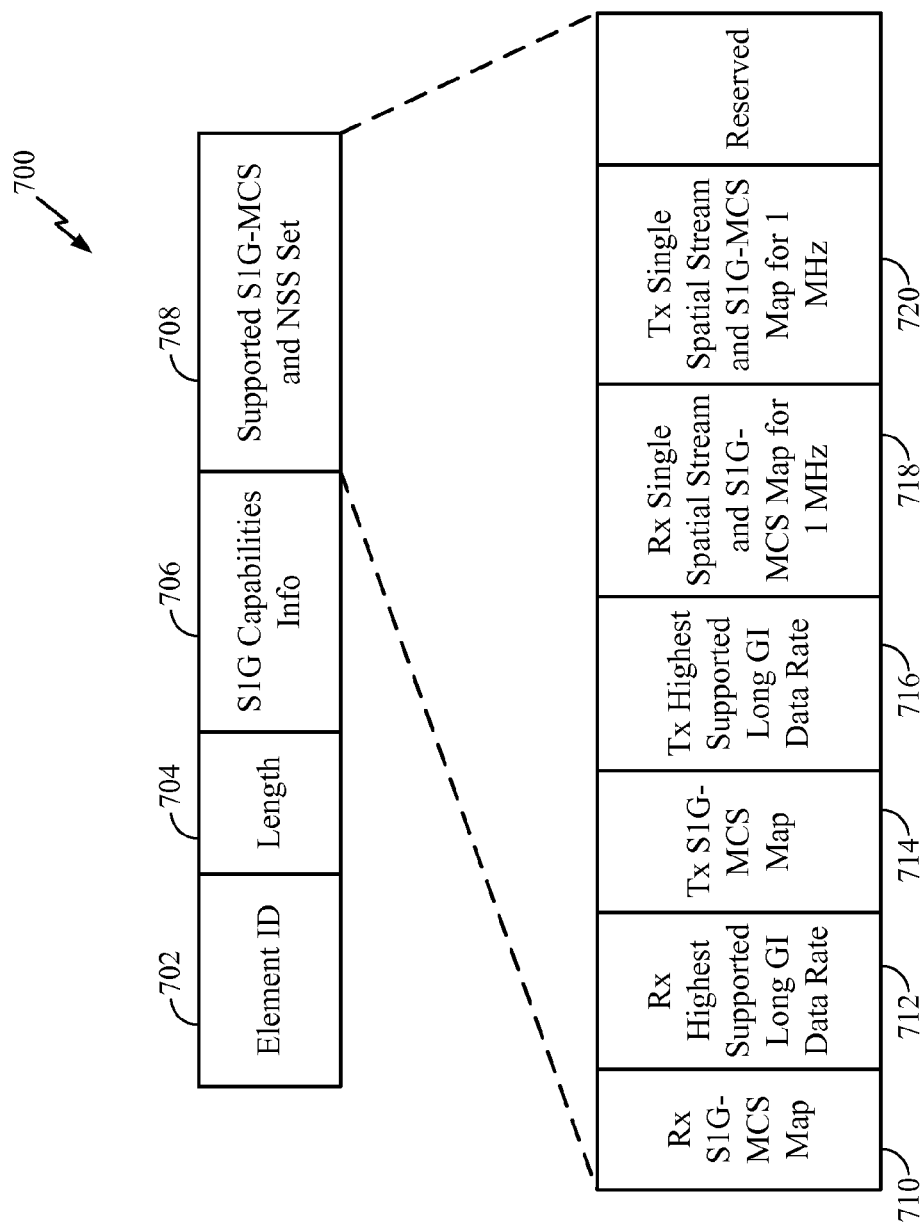
FIG. 7 illustrates an exemplary information element format, in accordance with certain aspects of the present disclosure.

FIG. 7 illustrates an exemplary S1G Capabilities element, according to aspects of the present disclosure. The exemplary S1G Capabilities element contains a number of fields that are used to advertise S1G capabilities of an S1G STA. The Element ID field 702 and Length field 704 are defined in IEEE Std 802.11. The structure of the S1G Capabilities Info field 706 is defined in IEEE Std 802.11. The Supported S1G-MCS and NSS Set field 708 is used to convey the combinations of S1G-MCSs and spatial streams that a STA supports for reception and the combinations of S1G-MCSs and spatial streams that the STA supports for transmission. The Supported S1G-MCS and NSS Set subfields are described below with respect to FIGS. 8A and 8B.

FIGS. 8A and 8B combined illustrate exemplary definitions 800 for subfields of a Supported S1G-MCS and NSS Set field 708, according to aspects of the present disclosure. The subfields of a Supported S1G-MCS and NSS Set field 708 include an Rx S1G-MCS Map subfield 710, an Rx Highest Supported Long GI Data Rate subfield 712, a Tx S1G-MCS Map subfield 714, a Tx Highest Supported Long GI Data Rate subfield 716, an Rx Single Spatial Stream and S1G-MCS Map for 1 MHz subfield 718, and a Tx Single Spatial Stream and S1G-MCS Map for 1 MHz subfield 720.

As described herein, the Rx/Tx S1G-MCS Map subfields 710/714 and the Rx/Tx Single Spatial Stream and S1G-MCS Map for 1 MHz subfields 718/720 may be used to signal different transmit (TX) and receive (RX) MCS sets for greater than or equal to two MHz bandwidths and another MCS set for smaller than one MHz bandwidths. Example definitions for these fields are provided in the subsequent paragraphs.

The Rx S1G-MCS Map subfield indicates the maximum value of the RXVECTOR parameter MCS of a PPDU that can be received at all channel widths supported by the STA for each number of spatial streams. However, if the value of the Rx Single Spatial Stream and S1G-MCS Map for 1 MHz subfield is greater than or equal to 1, then only the value of the Max S1G-MCS for 1 SS subfield that is indicated by the Rx Single Spatial Stream and S1G-MCS Map subfield is applicable for 1 MHz channel width. For example and with reference to FIG. 9, a STA may transmit an indication that the STA can receive over 1 MHz, 2 MHz, 4 MHz, and 8 MHz bandwidths. In the example, the STA may also transmit an Rx S1G-MCS Map subfield in an S1G Capabilities Element with a value of 1 in the first subfield indicating the STA can receive S1G-MCS 7 for one spatial stream, a value of 1 in the second subfield indicating the STA can receive S1G-MCS 7 for two spatial streams, a value of 0 in the third subfield indicating the STA can receive S1G-MCS 2 for three spatial streams, and a value of 0 in the fourth subfield indicating the STA can receive S1G-MCS 2 for four spatial streams over all of the indicated bandwidths. Still in the example, the STA may transmit a value of 1 in the Rx Single Spatial Stream and S1G-MCS Map for 1 MHz subfield, indicating that for a single spatial stream and a 1 MHz bandwidth channel, the STA can receive S1G-MCS 2, and not S1G-MCS 7 as indicated by the first subfield of the Rx S1G-MCS Map. In the example, the STA can receive S1G-MCS 7 on one spatial stream in 2 MHz, 4 MHz, and 8 MHz bandwidth channels.

The Tx S1G-MCS Map subfield indicates the maximum value of the TXVECTOR parameter MCS of a PPDU that can be transmitted at all channel widths supported by this STA for each number of spatial streams. However, if the value of the Tx Single Spatial Stream and S1G-MCS Map for 1 MHz subfield is greater than or equal to 1, then only the value of the Max S1G-MCS for 1 SS subfield that is indicated by the Tx Single Spatial Stream and S1G-MCS Map subfield is applicable for 1 MHz channel width, similar to the interaction of the values of the Rx S1G-MCS Map subfield and Rx Single Spatial Stream and S1G-MCS Map subfield, described above.

The Rx Single Spatial Stream and S1G-MCS Map for 1 MHz subfield indicates whether only a single spatial stream PPDU can be received at 1 MHz channel width by this STA. The subfield is two bits long and thus may convey values of 0, 1, 2, or 3. The value of 0 indicates a same number of spatial streams and same Max S1G-MCS as indicated by the Rx S1G-MCS Map field. The value of 1 indicates single spatial stream only and with Max S1G-MCS as indicated by a value of 0 in the S1G-MCS for 1 SS subfield. The value of 2 indicates single spatial stream only and with Max S1G-MCS as indicated by a value of 1 in the S1G-MCS for 1 SS subfield. The value of 3 indicates single spatial stream only and with Max S1G-MCS as indicated by a value of 2 in the S1G-MCS for 1 SS subfield.

The Tx Single Spatial Stream and S1G-MCS Map for 1 MHz subfield indicates whether only a single spatial stream PPDU can be transmitted at 1 MHz channel width by this STA. The subfield may be encoded with values of 0, 1, 2, or 3. The value of 0 indicates the STA can transmit on a 1 MHz bandwidth channel a same number of spatial streams and same Max S1G-MCS as indicated by Tx S1G-MCS Map subfield. The value of 1 indicates the STA can transmit on a 1 MHz bandwidth channel a single spatial stream only and with Max S1G-MCS as indicated by a value of 0 in the S1G-MCS for 1 SS subfield. The value of 2 indicates the STA can transmit on a 1 MHz bandwidth channel a single spatial stream only and with Max S1G-MCS as indicated by a value of 1 in the S1G-MCS for 1 SS subfield. The value of 3 indicates the STA can transmit on a 1 MHz bandwidth channel a single spatial stream only and with Max S1G-MCS as indicated by a value of 2 in the S1G-MCS for 1 SS subfield.

An S1G STA may indicate a set of MCSs that the STA supports when receiving a channel with a bandwidth of two MHz and higher by setting the appropriate value of the Rx S1G-MCS Map subfield as indicated in the definition shown in FIGS. 8A and 8B, and according to FIG. 9. Similarly, the S1G STA may indicate a set of MCSs that the STA supports when transmitting a channel with a bandwidth of two MHz and higher by setting the appropriate value of the Tx S1G-MCS Map subfield.

The S1G STA may indicate a different set of MCSs that the STA supports when receiving a channel with a bandwidth of one MHz and lower by setting the appropriate value of the Rx Single Spatial Stream and S1G-MCS Map for 1 MHz subfield. Similarly, the S1G STA may indicate a different set of MCSs that the STA supports when transmitting a channel with a bandwidth of one MHz and lower by setting the appropriate value of the Tx Single Spatial Stream and S1G-MCS Map for 1 MHz subfield. While FIGS. 8A and 8B refer to an S1G STA indicating the different sets of MCSs that the STA supports, the disclosure is not so limited, as APs may also indicate different sets of MCSs that the APs support by setting the appropriate values in the subfields of the Supported S1G-MCS and NSS Set field.

FIG. 9 illustrates an exemplary subfield encoding map 900, according to aspects of the present disclosure. The exemplary Rx S1G-MCS Map and Tx S1G-MCS Map subfields illustrated in FIGS. 8A and 8B may be encoded by using the encodings illustrated in FIG. 9. As illustrated in FIG. 9, the exemplary Rx S1G-MCS Map and Tx S1G-MCS Map subfields comprise four subfields 902, 904, 906, 908 named Max S1G-MCS For 1 SS, Max S1G-MCS For 2 SS, Max S1G-MCS For 3 SS, and Max S1G-MCS For 4 SS. Each Max S1G-MCS for n SS subfield (where n=1, . . . , 4) may have values of 0 to 3. A value of 0 indicates support for S1G-MCS 2 for n spatial streams. A value of 1 indicates support for S1G-MCS 7 for n spatial streams. A value of 2 indicates support for S1G-MCS 9 for n spatial streams. A value of 3 indicates that n spatial streams are not supported.

An S1G-MCS indicated as supported in the S1G-MCS Map fields for a particular number of spatial streams might not be valid at all bandwidths and might be limited by the declaration of Tx Highest Supported Long GI Data Rates and Rx Highest Supported Long GI Data Rates and might be affected by additional rate selection constraints for S1G PPDUs. For 1 MHz, MCS10 may always be supported.

For example, a STA may indicate that it supports receiving one spatial stream transmissions using MCS9 for channel bandwidths of two MHz and higher by transmitting a value of 2 in the Max S1G-MCS For 1 SS subfield of the Rx S1G-MCS Map subfield.

The subfield encoding map illustrated in FIG. 9 may also be used by the Rx Single Spatial Stream and S1G-MCS Map for 1 MHz subfield and the Tx Single Spatial Stream and S1G-MCS Map for 1 MHz subfield shown in FIGS. 8A and 8B. For example, a STA may indicate that it supports receiving one spatial stream transmissions using MCS9 for channel bandwidths of one MHz and lower by transmitting a value of 3 in the Rx Single Spatial Stream and S1G-MCS Map for 1 MHz subfield (e.g., setting the value of this subfield to 3 has the effect of specifying, for 1 MHz, the same MCS set as setting the value of subfield 902 to 2 has for higher bandwidths). As shown in FIGS. 8A and 8B, a similar effect indicating MCS2 or MCS7 may be achieved by setting the Rx Single Spatial Stream and S1G-MCS Map value to 1 (specifying an MCS set corresponding to a value of 0 for subfield 902) or 2 (specifying an MCS set corresponding to a value of 1 for subfield 902).

The exemplary subfield encodings illustrated in FIG. 9 define sets as including MCS10, an MCS with the indicated index number, and all MCSs with lower index numbers than the indicated index number, e.g., a set may include MCS10, MCS2, MCS1, and MCS0. However, the disclosure is not so limited, and MCS sets may be defined using other definitions.

The exemplary subfields and subfield encodings illustrated in FIGS. 7-9 refer to a "Rx Single Spatial Stream and S1G-MCS Map for 1 MHz subfield" and a "Tx Single Spatial Stream and S1G-MCS Map for 1 MHz subfield," however, the present disclosure is not limited to wireless nodes supporting a second bandwidth using only a single spatial stream. According to aspects of the present disclosure, a wireless node may advertise a first capability to support a first MCS set for a first bandwidth and a second capability to support a second MCS set for a second bandwidth using any number of spatial streams that the wireless node can transmit and/or receive. The number of spatial streams supported for the second MCS set and the second bandwidth may be defined in a standard, determined from a transmitted capabilities element (e.g., an S1G Capabilities element), or some combination of the two. According to aspects of the present disclosure, subfield encodings for a subfield (e.g., the subfield encoding map in FIG. 9) used to advertise a first capability may also be used for a subfield used to advertise a second capability. For example, subfields 718 and 720 may be defined (e.g., in an IEEE 802.11 standard) as advertising a capability to support an MCS set to transmit and receive two spatial streams for a 1 MHz bandwidth. In the example, subfields 718 and 720 may be encoded by using the encodings illustrated in FIG. 9, which are also used to encode other subfields (e.g., subfields 710 and 714) advertising capabilities to support a different MCS set at a different bandwidth.

Figure 10:
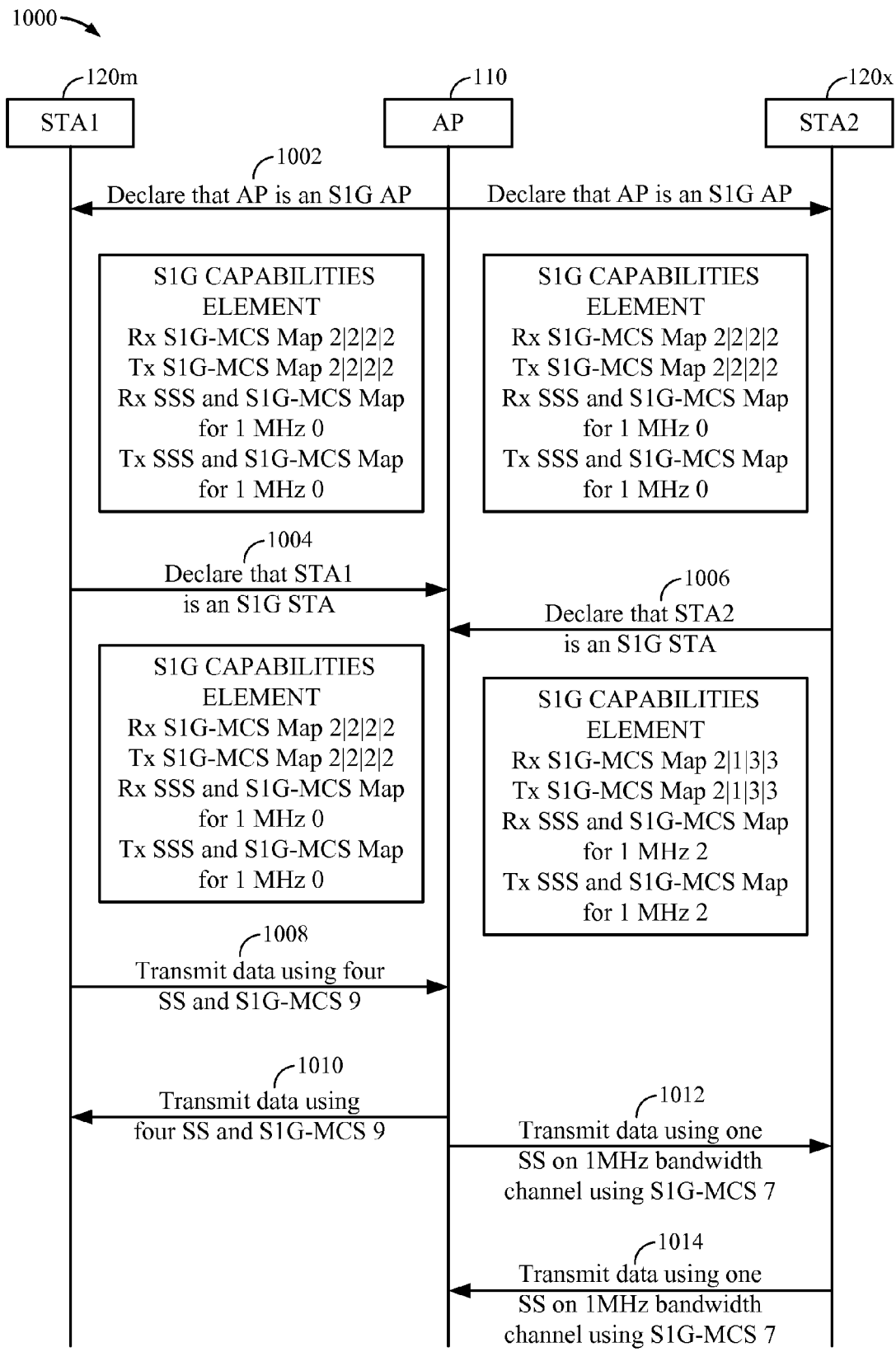
FIG. 10 illustrates an exemplary call flow, in accordance with aspects of the present disclosure.

FIG. 10 illustrates an exemplary call flow 1000 between two S1G STAs 120*m* and 120*x* and an S1G AP 110. The call flow begins with the AP declaring that the AP is an S1G AP by transmitting an S1G capabilities element at 1002. The AP indicates that the AP can receive 1, 2, 3, or 4 spatial streams using S1G-MCS 9 by transmitting "2" in all four subfields of the Rx S1G-MCS Map subfield. Similarly, the AP indicates that the AP can transmit 1, 2, 3, or 4 spatial streams using S1G-MCS 9 by transmitting "2" in all four subfields of the Tx S1G-MCS Map subfield. The AP also indicates that it can receive a 1 MHz bandwidth channel using the same numbers of spatial streams and S1G-MCS (i.e., 1, 2, 3, or 4 spatial streams using S1G-MCS) by transmitting a "0" in the Rx Single Spatial Stream and S1G-MCS Map for 1 MHz subfield, abbreviated "Rx SSS and S1G-MCS Map for 1 MHz" in FIG. 10. Similarly, the AP indicates that it can transmit a 1 MHz bandwidth channel using the same numbers of spatial streams and S1G-MCS (i.e., 1, 2, 3, or 4 spatial streams using S1G-MCS) by transmitting a "0" in the Tx Single Spatial Stream and S1G-MCS Map for 1 MHz subfield, abbreviated "Tx SSS and S1G-MCS Map for 1 MHz." While the call flow 1000 shows the AP making a single transmission that both STAs receive, the disclosure is not so limited and the AP may transmit the S1G capabilities element in separate transmissions to multiple STAs.

At 1004, STA1 declares that STA1 is an S1G STA by transmitting an S1G capabilities element. STA1 indicates that it can receive 1, 2, 3, or 4 spatial streams using S1G-MCS 9 by transmitting "2" in all four subfields of the Rx S1G-MCS Map subfield. Similarly, STA1 indicates that it can transmit 1, 2, 3, or 4 spatial streams using S1G-MCS 9 by transmitting "2" in all four subfields of the Tx S1G-MCS Map subfield. STA1 also indicates that it can receive a 1 MHz bandwidth channel using the same numbers of spatial streams and S1G-MCS (i.e., 1, 2, 3, or 4 spatial streams using S1G-MCS) by transmitting a "0" in the Rx Single Spatial Stream and S1G-MCS Map for 1 MHz subfield, abbreviated "Rx SSS and S1G-MCS Map for 1 MHz" in FIG. 10. Similarly, STA1 indicates that it can transmit a 1 MHz bandwidth channel using the same numbers of spatial streams and S1G-MCS (i.e., 1, 2, 3, or 4 spatial streams using S1G-MCS) by transmitting a "0" in the Tx Single Spatial Stream and S1G-MCS Map for 1 MHz subfield, abbreviated "Tx SSS and S1G-MCS Map for 1 MHz."

At 1006, STA2 declares that it is an S1G STA by transmitting an S1G capabilities element. STA2 indicates that it can receive 1 spatial stream using S1G-MCS 9 by transmitting "2" in the first subfield of the Rx S1G-MCS Map subfield. STA2 indicates that it can receive 2 spatial streams using S1G-MCS 7 by transmitting "1" in the second subfield of the Rx S1G-MCS Map subfield. STA2 indicates that it cannot receive 3 or 4 spatial streams by transmitting "3" in the third and fourth subfields of the Rx S1G-MCS Map subfield. As an example, STA2 may not be able to receive 3 or 4 spatial streams because STA2 has two antennas. Similarly, STA2 indicates that it can transmit 1 spatial stream using S1G-MCS 9 by transmitting "2" in the first subfield of the Tx S1G-MCS Map subfield. STA2 indicates that it can transmit 2 spatial streams using S1G-MCS 7 by transmitting "1" in the second subfield of the Tx S1G-MCS Map subfield. STA2 indicates that it cannot transmit 3 or 4 spatial streams by transmitting "3" in the third and fourth subfields of the Tx S1G-MCS Map subfield. STA2 indicates that it can receive a single spatial stream on a 1 MHz bandwidth channel using S1G-MCS 7 by transmitting a "2" in the Rx Single Spatial Stream and S1G-MCS Map for 1 MHz subfield. Similarly, STA2 indicates that it can transmit a single spatial stream on a 1 MHz bandwidth channel using S1G-MCS7 by transmitting a "2" in the Tx Single Spatial Stream and S1G-MCS Map for 1 MHz subfield.

At 1008, STA1 transmits data to the AP. In the exemplary call flow, there are good channel conditions between STA1 and the AP, so STA1 determines to use a wide bandwidth, high throughput transmission mode. STA1 determines from the S1G capabilities element transmitted by the AP at 1002 that the AP can receive 4 spatial streams transmitted using S1G-MCS 9. STA1 is capable of transmitting 4 spatial streams using S1G-MCS 9, and so STA1 transmits the data to the AP using 4 spatial streams (SS) and S1G-MCS 9.

At 1010, the AP transmits data to STA1. There are still good channel conditions between STA1 and the AP, so the AP determines to use a wide bandwidth, high throughput transmission mode. The AP determines from the S1G capabilities element transmitted by STA1 at 1004 that STA1 can receive four spatial streams transmitted using S1G-MCS 9. The AP is capable of transmitting four spatial streams using S1G-MCS 9, and so the AP transmits the data to STA1 using four spatial streams (SS) and S1G-MCS 9.

At 1012, the AP transmits data to STA2. In the exemplary call flow, there are poor channel conditions (e.g., STA2 and the AP have a long distance between them) between STA2 and the AP, so the AP determines to use a 1 MHz bandwidth transmission mode. The AP determines from the S1G capabilities element transmitted by STA2 at 1006 that STA2 can receive 1 spatial stream transmitted using S1G-MCS 7 on a 1 MHz bandwidth channel. The AP is capable of transmitting 4 spatial streams using S1G-MCS 9, but the AP determines to transmit the data to STA2 using 1 spatial streams (SS) and S1G-MCS 7 on a 1 MHz bandwidth channel, due to the poor channel conditions.

1014, STA2 transmits data to the AP. There are still poor channel conditions between STA2 and the AP, so STA2 determines to use a 1 MHz bandwidth transmission mode. STA2 determines from the S1G capabilities element transmitted by the AP at 1002 that the AP can receive four spatial streams transmitted using S1G-MCS 9. STA2 is capable of transmitting one spatial stream using S1G-MCS 7, and so STA1 transmits the data to the AP using one spatial stream (SS) and S1G-MCS 7.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 and 500 illustrated in FIGS. 4 and 5 correspond to means 400A and 500A illustrated in FIGS. 4A and 5A, respectively.

For example, means for transmitting may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for processing, means for determining, means for detecting, means for scanning, means for selecting, or means for terminating operation may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

According to certain aspects, such means may be implemented by processing systems configured to perform the corresponding functions by implementing various algorithms (e.g., in hardware or by executing software instructions) described above for performing fast association. For example, means for identifying wakeup periods may be implemented by a processing system performing an algorithm that identifies wakeup periods based on a configuration (e.g., via an IE), means for determining whether to enable radio functions during wakeup periods may be implemented by a (same or different) processing system performing an algorithm that takes, as input, the wakeup periods and whether the presence of data has been indicated, while means for enabling radio functions may be implemented a (same or different) processing system performing an algorithm that takes, as input, the decision from means for determining and generates signals to enable/disable the radio functions accordingly.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term receiver may refer to an RF receiver (e.g., of an RF front end) or an interface (e.g., of a processor) for receiving structures processed by an RF front end (e.g., via a bus). Similarly, the term transmitter may refer to an RF transmitter of an RF front end or an interface (e.g., of a processor) for outputting structures to an RF front end for transmission (e.g., via a bus).

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to generate a frame having a first field that indicates a first modulation and coding scheme (MCS) set that the apparatus is capable of supporting for a first bandwidth and a second field that indicates a second MCS set that the apparatus is capable of supporting for a second bandwidth, wherein:
different values of the second field indicate different MCS sets the apparatus is capable of supporting for the second bandwidth,
the first field further indicates the apparatus is capable of supporting reception with the first MCS set for the first bandwidth and the second field further indicates the apparatus is capable of supporting reception with the second MCS set for the second bandwidth, and
the frame further comprises a third field that indicates a third MCS set that the apparatus is capable of supporting for transmission on the first bandwidth and a fourth field that indicates a fourth MCS set that the apparatus is capable of supporting for transmission on the second bandwidth; and
an interface configured to output the frame for transmission.

2. The apparatus of claim 1, wherein the first bandwidth comprises a bandwidth of 2 MHz or greater and the second bandwidth comprises a bandwidth of 1 MHz or less.

3. The apparatus of claim 1, wherein the different values of the second field indicate different numbers of spatial streams the apparatus is capable of supporting at the second bandwidth using the second MCS set.

4. The apparatus of claim 1, wherein at least one of the different values of the second field indicates a same number of spatial streams and MCS set as indicated by the first field.

5. The apparatus of claim 1, wherein at least one of the different values of the second field indicates that the apparatus is capable of supporting the second MCS set at the second bandwidth for a single spatial stream.

6. An apparatus for wireless communications, comprising:
a processing system configured to generate a frame having a first field that indicates a first modulation and coding scheme (MCS) set that the apparatus is capable of supporting for a first bandwidth and a second field that indicates a second MCS set that the apparatus is capable of supporting for a second bandwidth, wherein different values of the second field indicate different MCS sets the apparatus is capable of supporting for the second bandwidth, wherein the different MCS sets indicated by the different values of the second field correspond to different MCS sets that the apparatus can indicate via different values of the first field; and
an interface configured to output the frame for transmission.

7. The apparatus of claim 1, wherein the first MCS set comprises a MCS set that the apparatus is capable of supporting for a plurality of bandwidths including the first bandwidth.

8. The apparatus of claim 1, wherein the first MCS set comprises a MCS associated with different numbers of spatial streams.

9. An apparatus for wireless communications, comprising:
an interface for receiving a frame, from a wireless node, having a first field and a second field; and
a processing system configured to:
determine, from a value of the first field, a first modulation and coding scheme (MCS) set the wireless node supports for a first bandwidth,
determine, from a value of the second field, a second MCS set the wireless node supports for a second bandwidth,
determine from the value of the first field that the wireless node is capable of supporting reception with the first MCS set using the first bandwidth,
determine from the value of the second field that the wireless node is capable of supporting reception with the second MCS set using the second bandwidth,
determine from a value of a third field that the wireless node is capable of supporting a third MCS set for transmission using the first bandwidth,
determine from a value of a fourth field that the wireless node is capable of supporting a fourth MCS set for transmission using the second bandwidth, wherein different values of the fourth field indicate different MCS sets the apparatus is capable of supporting for the second bandwidth, and
configure the apparatus to communicate with the wireless node using at least one of:
the first bandwidth and a MCS in the first or third MCS set, or
the second bandwidth and a MCS in the second or fourth MCS set.

10. The apparatus of claim 9, wherein the first bandwidth comprises a bandwidth of 2 MHz or greater and the second bandwidth comprises a bandwidth of 1 MHz or less.

11. The apparatus of claim 9, wherein the processing system is configured to:
determine, from the value of the second field, a number of spatial streams the wireless node is capable of supporting for the second bandwidth using the second MCS set; and
configure the apparatus to communicate with the wireless node using the second bandwidth, a MCS in the second MCS set, and the determined number of spatial streams.

12. The apparatus of claim 9, wherein the processing system is configured to:
determine, from the value of the second field, that the wireless node is capable of supporting for the second bandwidth a same number of spatial streams and MCS set as indicated by the first field; and
configure the apparatus to communicate with the wireless node using the second bandwidth, a MCS in the first MCS set, and the determined number of spatial streams.

13. The apparatus of claim 9, wherein the processing system is configured to:
determine, from the value of the second field, that the wireless node is capable of supporting the second MCS set for the second bandwidth for a single spatial stream; and
configure the apparatus to communicate with the wireless node using the second bandwidth, a MCS in the second MCS set, and a single spatial stream.

14. The apparatus of claim 9, wherein the processing system is configured to:
determine, from the value of the first field, that the wireless node is capable of supporting the first MCS set for a plurality of bandwidths including the first bandwidth; and configure the apparatus to communicate with the wireless node using one of the plurality of bandwidths and a MCS in the first MCS set.

15. The apparatus of claim 9, wherein the processing system is configured to:
   determine, from the value of the first field, that the wireless node is capable of supporting a MCS in the first MCS set associated with different numbers of spatial streams; and
   configure the apparatus to communicate with the wireless node using the first bandwidth, a MCS in the first MCS set, and a number of spatial streams of the different numbers of spatial streams.

16. A method for wireless communications by an apparatus, comprising:
   generating a frame having a first field that indicates a first modulation and coding scheme (MCS) set that the apparatus is capable of supporting for a first bandwidth and a second field that indicates a second MCS set that the apparatus is capable of supporting for a second bandwidth, wherein:
      different values of the second field indicate different MCS sets the apparatus is capable of supporting for the second bandwidth,
      the first field further indicates the apparatus is capable of supporting reception with the first MCS set for the first bandwidth and the second field further indicates the apparatus is capable of supporting reception with the second MCS set for the second bandwidth, and
      the frame further comprises a third field that indicates a third MCS set that the apparatus is capable of supporting for transmission on the first bandwidth and a fourth field that indicates a fourth MCS set that the apparatus is capable of supporting for transmission on the second bandwidth; and
   outputting the frame for transmission.

17. The method of claim 16, wherein the first bandwidth comprises a bandwidth of 2 MHz or greater and the second bandwidth comprises a bandwidth of 1 MHz or less.

18. The method of claim 16, wherein the different values of the second field indicate different numbers of spatial streams the apparatus is capable of supporting at the second bandwidth using the second MCS set.

19. The method of claim 16, wherein at least one of the different values of the second field indicates a same number of spatial streams and MCS set as indicated by the first field.

20. The method of claim 16, wherein at least one of the different values of the second field indicates a different MCS set that the apparatus is capable of supporting at the second bandwidth for a single spatial stream.

21. A method for wireless communications by an apparatus, comprising:
   generating a frame having a first field that indicates a first modulation and coding scheme (MCS) set that the apparatus is capable of supporting for a first bandwidth and a second field that indicates a second MCS set that the apparatus is capable of supporting for a second bandwidth, wherein different values of the second field indicate different MCS sets the apparatus is capable of supporting for the second bandwidth, wherein the different MCS sets indicated by the different values of the second field correspond to different MCS sets that the apparatus can indicate via different values of the first field; and
   outputting the frame for transmission.

22. A method for wireless communications by an apparatus, comprising:
   receiving a frame, from a wireless node, having a first field and a second field;
   determining, from a value of the first field, a first modulation and coding scheme (MCS) set the wireless node supports for a first bandwidth;
   determining, from a value of the second field, a second MCS set the wireless node supports for a second bandwidth
   determining, from the value of the first field, the first MCS set the wireless node supports for the first bandwidth comprises determining that the wireless node is capable of supporting reception with the first MCS set using the first bandwidth;
   determining, from the value of the second field, the second MCS set the wireless node supports for the second bandwidth comprises determining that the wireless node is capable of supporting reception with the second MCS set using the second bandwidth;
   determining from a value of a third field that the wireless node is capable of supporting a third MCS set for transmission using the first bandwidth;
   determining from a value of a fourth field that the wireless node is capable of supporting a fourth MCS set for transmission using the second bandwidth, wherein different values of the fourth field indicate different MCS sets the wireless node is capable of supporting for the second bandwidth; and
   communicating with the wireless node using at least one of:
      the first bandwidth and a MCS in the first or third MCS set, and
      the second bandwidth and a MCS in the second or fourth MCS set.

23. The method of claim 22, wherein the first bandwidth comprises a bandwidth of 2 MHz or greater and the second bandwidth comprises a bandwidth of 1 MHz or less.

24. The method of claim 22, further comprising:
   determining, from the value of the second field, a number of spatial streams the wireless node is capable of supporting for the second bandwidth using the second MCS set; and
   communicating with the wireless node using the second bandwidth, a MCS in the second MCS set, and the determined number of spatial streams.

25. The method of claim 22, further comprising:
   determining, from the value of the second field, that the wireless node is capable of supporting for the second bandwidth a same number of spatial streams and MCS set as indicated by the first field; and
   communicating with the wireless node using the second bandwidth, a MCS in the first MCS set, and the determined number of spatial streams.

26. The method of claim 22, further comprising:
   determining, from the value of the second field, that the wireless node is capable of supporting the second MCS set for the second bandwidth for a single spatial stream; and
   communicating with the wireless node using the second bandwidth, a MCS in the second MCS set, and a single spatial stream.

27. The apparatus of claim 1, further comprising a transmitter for transmitting the frame, wherein the apparatus is configured as a wireless station.

28. The apparatus of claim 9, further comprising a receiver for receiving the frame, wherein the apparatus is configured as an access point.

* * * * *